United States Patent [19]

Date

[11] Patent Number: 4,916,477
[45] Date of Patent: Apr. 10, 1990

[54] IMAGE SENSING APPARATUS
[75] Inventor: Nobuaki Date, Kanagawa, Japan
[73] Assignee: Canon Kabushiki Kaisha, Tokyo, Japan
[21] Appl. No.: 336,204
[22] Filed: Apr. 11, 1989
[30] Foreign Application Priority Data Apr. 15, 1988 [JP] Japan ................................ 63-092935

[51] Int. Cl.⁴ ........................... G03B 7/08; H04N 3/14
[52] U.S. Cl. .................................. 354/436; 358/213.13
[58] Field of Search ............... 354/435, 436, 437, 232, 354/272, 453, 481, 483, 429, 431–434; 358/213.13

[56] References Cited
U.S. PATENT DOCUMENTS 4,734,777  3/1988  Okino et al. ..................... 358/213.13

Primary Examiner—L. T. Hix
Assistant Examiner—David M. Gray
Attorney, Agent, or Firm—Robin, Blecker, Daley & Driscoll

[57] ABSTRACT

An image sensing apparatus having a diaphragm of a normally closed type for controlling the entrance of light into an image sensor. The diaphragm is opened from a fully closed state to a predetermined aperture value based on the output of a light measuring element other than the image sensor and is closed again when a first exposure operation is carried out, and then it is opened from the fully closed state to another predetermined aperture value which is based on the signal formed by the image sensor during the first exposure operation and is closed again when a second exposure operation is carried out. An electrical signal formed by the image sensor during the second exposure operation is recorded as a still picture signal, thus giving an advantage that the aging change of the diaphragm and the tolerance of the exposure can be canceled.

10 Claims, 5 Drawing Sheets

IMAGE SENSING APPARATUS

BACKGROUND OF THE INVENTION

1. Field of the Invention

This invention relates to an image sensing apparatus having an improved diaphragm or an accumulation (storage) control portion.

2. Description of the Related Art

For ordinary cameras, the exposure device such as shutter and diaphragm to be used therein is available in many forms with respect to the camera's specific features and others. Yet, no exposure device suited to the still video camera which necessitates far higher an accuracy of exposure control has been developed.

Of the conventional, publicly known exposure devices, what is so-called a diaphragm-cum-shutter has features adaptable to be used in the still video camera. But, the conventional, publicly known diaphragm-cum-shutter, because of its having the following drawback, has hardly been applied to the still video camera.

Most of the conventional diaphragm-cum-shutters are constructed with the use of a sub-diaphragm arranged in front of the light receiving element to open and close at the same time when the diaphragm of the photographic lens opens and closes, that is, in the form of a diaphragm-cum-shutter with sub-diaphragm. In operating this diaphragm-cum-shutter with sub-diaphragm, as an exposure operation goes on, at the same time that the diaphragm is opened, the sub-diaphragm also is opened. Since the sub-diaphragm has been opened, light enters the photosensitive element arranged behind the sub-diaphragm. The light that has entered the photosensitive element is integrated to a value which is detected as an amount of light incident on the image sensing plane. When that integrated value has reached a predetermined value (the exposure value determined depending on the result of light measurement), a current is supplied to an electromagnet for controlling the closing operation of the diaphragm. Thus, the diaphragm is closed.

This publicly known diaphragm-cum-shutter with sub-diaphragm has the feature that in the photographic situation where the brightness is so high that the diaphragm should be opened to a minimum aperture, even if, soon after the light having passed through the sub-diaphragm has entered the photosensitive element, the diaphragm closing signal is output to the electromagnet, the diaphragm, because of the response delay of the electromagnet, cannot immediately close and, therefore, an over-exposure always results.

Meanwhile, for the photographic situation of middle brightness level where the diaphragm does not fully open, the ratio of the amount of exposure during the opening operation of the diaphragm to the amount of exposure during the closing operation of the diaphragm is almost constant, permitting premature production of the diaphragm closing signal to the electromagnet by previously estimating the amount of exposure to be made during the closing operation of the diaphragm. Therefore, good linearity of exposure control can be assured. This leads to the possibility of controlling the exposure with very high accuracy.

However, for a photographic situation of lower brightness level than that at which the diaphragm fully opens, because the ratio of the exposure integrated until the diaphragm closing signal is given to the electromagnet to the exposure integrated during the closing operation of the diaphragm does not become constant, the amount of exposure during the closing operation of the diaphragm cannot previously be estimated. Hence, there are many occasions that involve an under-exposure or over-exposure.

As a result, with the publicly known diaphragm-cum-shutter with sub-diaphragm, the exposure cannot be controlled in linear manner over the entire range of the high brightness region, the middle brightness region and the low brightness region. Therefore, fluctuations take place in the exposure value over the aforesaid three regions. For this reason, the publicly known diaphragm-cum-shutter with sub-diaphragm cannot be used as the exposure device for the camera which requires high accuracy of exposure such as the still video camera.

So, to remove the above-described drawback of the publicly known diaphragm-cum-shutter with sub-diaphragm, use of an encoder for detecting the amount of movement of the diaphragm, or a diaphragm-cum-shutter with encoder, is proposed. This diaphragm-cum-shutter with encoder is arranged so that the amount of movement, or the position, of the diaphragm is detected by the encoder to determine what position the diaphragm takes or what size the exposure aperture has, at every one time unit, thereby giving an advantage that in best timing based on that result, the diaphragm closing signal can be applied to the electromagnet.

However, this diaphragm-cum-shutter with encoder, too, because of the following reason, is not suited to perform a highly accurate exposure control. In more detail, the running characteristic of the diaphragm at the time of the opening operation varies with environment such as temperature, humidity, the attitude, aging variation, of the diaphragm, etc.. Therefore, while the amount of opening movement, or the position, of the diaphragm can be determined, the running characteristics (the speed and acceleration at any given moment) of the diaphragm are left unknown. Hence, however accurate the detection of the amount of opening movement, or the position, of the diaphragm may be, the position, or the time at which the diaphragm starts to close cannot accurately be controlled. Also, in a case where a motor or like drive source is used as arranged to give the diaphragm a movement controlled in the opening direction, the variation of the drive voltage of the motor, the variation of the resistance value of the motor coil due to the elevation of the motor temperature by the current supply, and other factors cause the running characteristics of the diaphragm to vary. Therefore, even if the amount of opening movement, or the position, of the diaphragm has accurately been detected by the encoder, the position at which the diaphragm starts to close cannot accurately be controlled, because the running characteristics of the diaphragm are not detected. Hence, in the case using the encoder in determining the position of the diaphragm at a time during the opening operation of the diaphragm so that based on this determined value, the electromagnet is actuated to close the diaphragm, for fast and slow opening speeds of the diaphragm, even though their values determined by the encoder are equal to each other, the positions at which the diaphragm starts to close differ from each other. Therefore, the exposure times and the exposure quantities are caused to differ.

FIG. 5 is a graph illustrating different manners in which the diaphragm-cum-shutter of the type described above in which the opening movement of the diaphragm blades are driven by the motor, where the exposure quantity varies with variation of the running characteristics of the diaphragm blades due to the causes such as that of varying the drive voltage of the motor. In FIG. 5, what is represented by solid lines L is the ideal running characteristic. In the case of too fast an opening speed of the diaphragm blades, the running characteristic is shown by dashed lines $L_1$. In the case of too slow an opening speed of the diaphragm blades, the running characteristic is shown by double dot and single dash lines $L_2$. Also, in FIG. 5, $P_1$ to $P_3$ represent points of time at which a signal for closing the diaphragm blades is given to the electromagnet in the aforesaid cases respectively. $P_1'$ to $P_3'$ represent points of time at which the electromagnet actually starts to operate and also represent a size of aperture opening at each of these times.

As is apparent from FIG. 5, it is understood that when the opening speed of the diaphragm blades varies, the exposure quantity integrated during one cycle of opening and closing operation of the diaphragm blades is caused also to vary. Hence, the conventional diaphragm-cum-shutter with encoder which is characterized in that it is only the amount of opening movement of the diaphragm blades that the encoder is used to detect, has been unable to make a sufficiently highly accurate exposure control.

SUMMARY OF THE INVENTION

It is therefore an object of the invention to eliminate the problems inherent in the above-described types of diaphragm-cum-shutter and a novel exposure device capable of controlling exposure with a higher accuracy than was heretofore possible.

Another object is to provide an exposure device of which the accuracy of exposure control is high enough to be suited particularly to still video cameras.

According to the invention, in an embodiment applied to an image sensing apparatus, a diaphragm of a normally closed type is made to preliminarily open and close prior to making an actual exposure by way of the diaphragm, wherein the amount of movement of the diaphragm and the amount of light to which an image sensor has been exposed through the thus-opened diaphragm are detected, and then, based on their detected values, a reference value for the actual exposure or opening and closing operation is determined, so that when carrying out the actual exposure or opening and closing operation which follows that preliminary opening and closing operation, the operation of the diaphragm is controlled in accordance with that reference value. Therefore. in the image sensing apparatus of the embodiment of the invention, because determination of the reference value in accordance with which the actual exposure is controlled is made to be based on the detected values of the exposure quantity and the amount of movement at the time of the preliminary opening and closing operation, when the actual exposure operation is performed, the exposure control is made by taking into account the exposure characteristics (or operation characteristics). Hence, it it possible to achieve a great increase of the accuracy of exposure control.

Other objects of the invention and its features will become apparent from the following descriptions and drawings.

DETAILED DESCRIPTION OF THE PREFERRED EMBODIMENT

The invention is next described in connection with an embodiment thereof by reference to the drawings.

Figure 1:
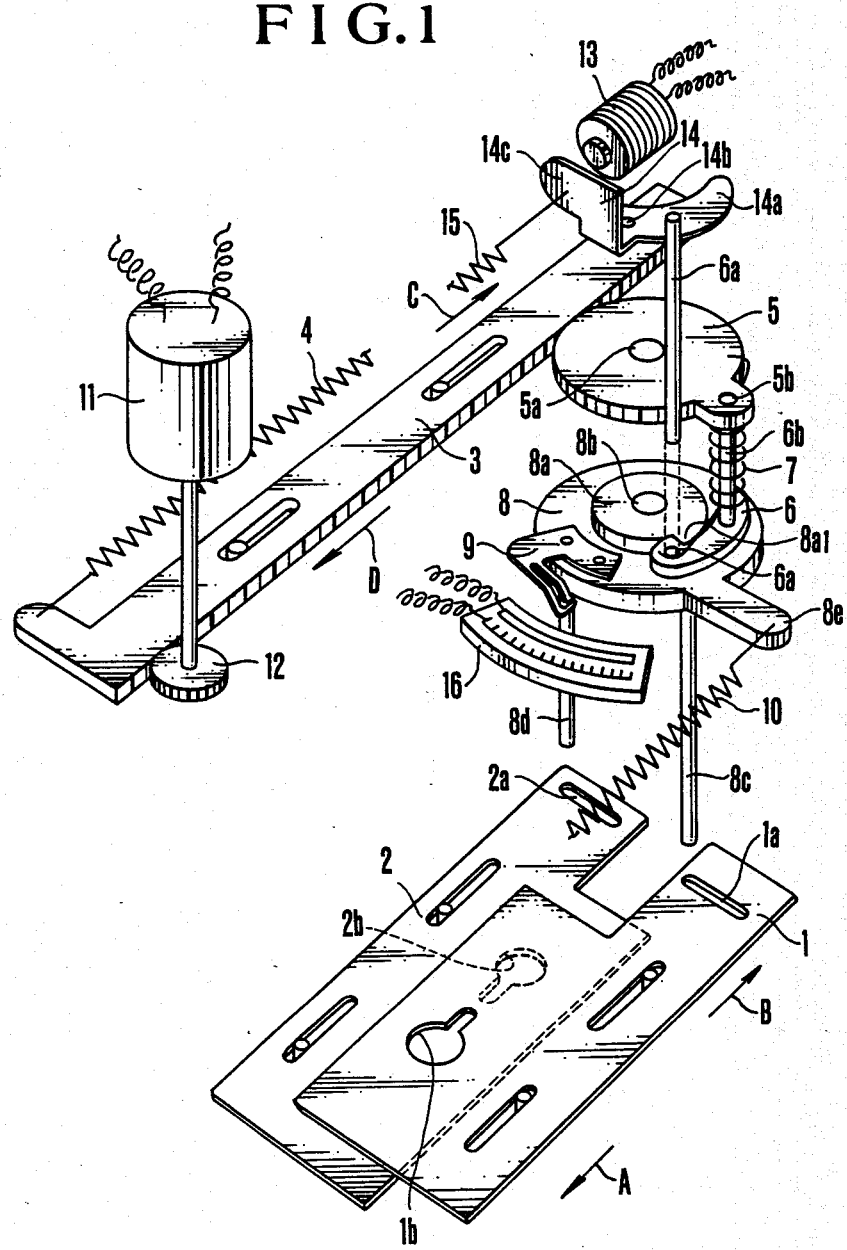
FIG. 1 is a perspective view of the mechanical arrangement of an embodiment of an exposure device according to the invention.

FIG. 1 in exploded perspective view shows the construction and arrangement of the mechanical parts of an embodiment of the exposure device according to the invention.

In FIG. 1, a pair of opening and closing members 1 and 2 movable relative to each other in respective directions of arrows A and B respectively, or vice versa, are formed as diaphragm blades. A blade drive plate 8 is arranged above the diaphragm blades 1 and 2 and has drive pins 8c and 8d extended therefrom into respective laterally elongated slots 1a and 2a bored in the diaphragm blades 1 and 2. Again, the diaphragm blades 1 and 2 have aperture openings 1b and 2b formed therein, respectively.

The blade drive plate 8 is rotatable about a shaft 8b. An engagement piece 8a having a projection $8a_1$ for engagement in the outer periphery thereof is fixedly mounted on a disc-shaped main body portion of the blade drive plate 8. A spring engaging extension 8e is formed on the outer periphery of the main body portion of the blade drive plate 8. A spring 10 whose one end is connected to that spring engaging extension 8e urges the blade drive plate 8 always in a clockwise direction about the shaft 8b.

The main body portion of the blade drive plate 8 has the aforesaid drive pins 8c and 8d which are mounted on the lower side thereof and has a slider 9 which is fixedly secured to the upper side thereof constituting part of means for detecting the amount of movement of the shutter blades 1 and 2. An encoder 16 is arranged below the blade drive plate 8 to be in sliding contact with the slider 9. Electrically conductive patterns formed on the encoder 16 are electrically connected to a detecting circuit (not shown) including a pulse counter and others.

Reference numeral 6 denotes a swinging member having a pawled portion at one end thereof engageable with the engagement piece 8a on the blade drive plate 8 and disposed on the blade drive 8. A post 6a and a shaft 6b are fixedly mounted on the swinging member 6. The post 6a engages with an armature 14 to be described later. The shaft 6b is inserted into an over-bored hole 5b in a radial, outward extension of a gear 5 positioned above the blade drive plate 8. A coil spring 7 is mounted around the shaft 6b, urging the swinging member 6 to turn about the shaft 6b in a clockwise direction.

The gear 5 is rotatable about a shaft 5a and is in mesh with a rack 3. The rack 3 is in mesh with a pinion 12, and is urged always in a direction of arrow C by a spring 4. The pinion 12 is mounted on the output shaft of an electric motor 11. When the motor 11 is energized, the pinion 12 is rotated in a counterclockwise direction as viewed in the figure.

The armature 14 rotatable about a pin 14b is disposed above the rack 3. One armed portion 14c of the armature 14 is positioned adjacent the core of an electromagnet 13. Another armed portion 14a is arranged in a position where it engages with the post 6a of the swinging member 6 and, when turning, can push the post 6a, thus being able to turn the swinging member 6 in the counterclockwise direction. The armature 14 is urged by a spring 15 to turn about the pin 14b in a counterclockwise direction.

The electromagnet 13 and the motor 11 are supplied with current in predetermined timing according to the command from a control device.

In the above-described mechanism, the blade drive plate 8 and the various parts for driving the plate 8 (the gear 5, rack 3, pinion 12, armature 14, electromagnet 13, springs 10, 4 and 15, etc.) constitute opening and closing means for causing the diaphragm blades 1 and 2 (or the opening and closing members) to perform the opening and closing operation. Also, the encoder 16 and the slider 9 and further a detecting circuit 32 constitute movement amount detecting means for detecting the amount of movement and the position of the opening and closing members (in other words, means for detecting the size of opening of an exposure aperture).

Incidentally, though not shown in FIG. 1, an image sensor 20 is positioned in axial alignment with the exposure aperture formed by the diaphragm blades 1 and 2. This image sensor 20, a signal processing circuit 21 for processing the output signal of the element and an integration circuit 22 for integrating the output of the image sensor 20 constitute incident light amount detecting means 17 for detecting the amount of incident light.

In the interior of the control device to which the aforesaid movement amount detecting means and the incident light amount detecting means 17 are electrically connected, there are formed operation control means for causing the opening and closing members (diaphragm blades) to perform opening and closing operation twice in sequence, and means responsive to the outputs of the movement amount detecting means and the incident light amount detecting means for determining and selecting the reference value for the operation of the opening and closing members.

Figure 2:
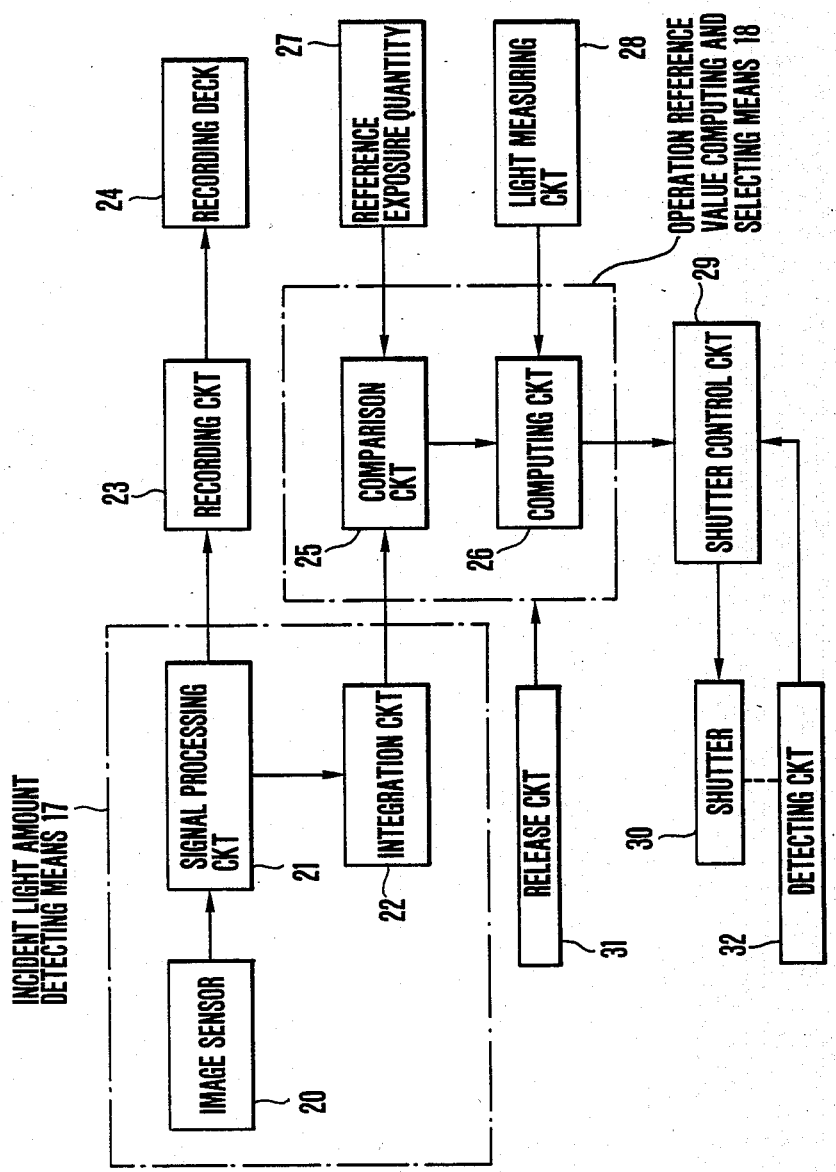
FIG. 2 is a block diagram of a part of the electrical arrangement of the exposure device of FIG. 1.

FIG. 2 roughly, or in block form, shows some electrical constituents of the exposure device of the invention, including the incident light amount detecting means, and the operation reference value forming means for forming a reference value for the operation of the opening and closing members when in that opening and closing operation which actually effects an exposure.

In FIG. 2, reference numeral 17 denotes the incident light amount detecting means; 18 denotes the operation reference value computing and selecting means for computing and selecting an operation reference value for the actual exposure opening and closing operation of the opening and closing members (the diaphragm blades 1 and 2); 23 denotes a recording circuit; 24 denotes a recording deck; 25 denotes a comparison circuit; 26 denotes a computing circuit; 27 denotes a reference exposure quantity; 28 denotes a light measuring circuit; 31 denotes a release circuit; 32 denotes a detecting circuit for counting the pulse number of the encoder 16. Again, in FIG. 2, a shutter control circuit 29 controls the current supply to the motor 11 and the electromagnet 13 included in a shutter unit 30 in such a manner that the opening and closing members are caused to perform a first sycle of opening and closing operation which effects no exposure, and a second cycle of opening and closing operation which effects an exposure.

Figure 3:
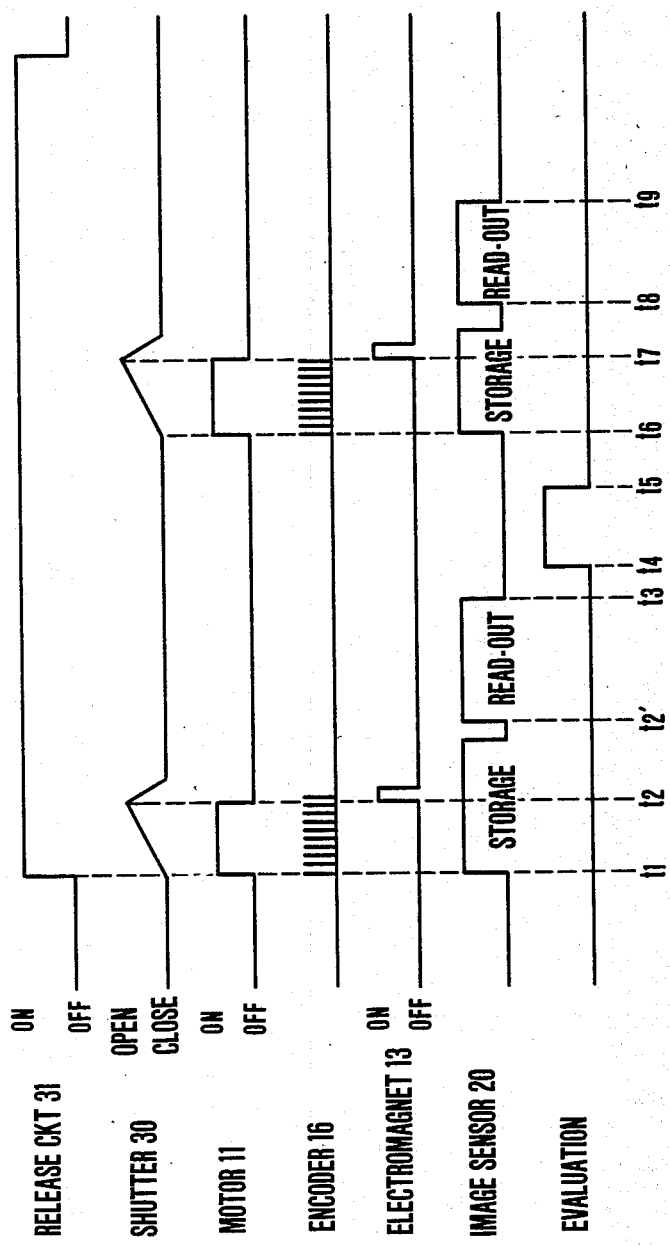
FIG. 3 is a timing chart illustrating a manner in which the exposure device of FIGS. 1 and 2 and those parts in the camera which are associated with the exposure device operate.
Figure 4:
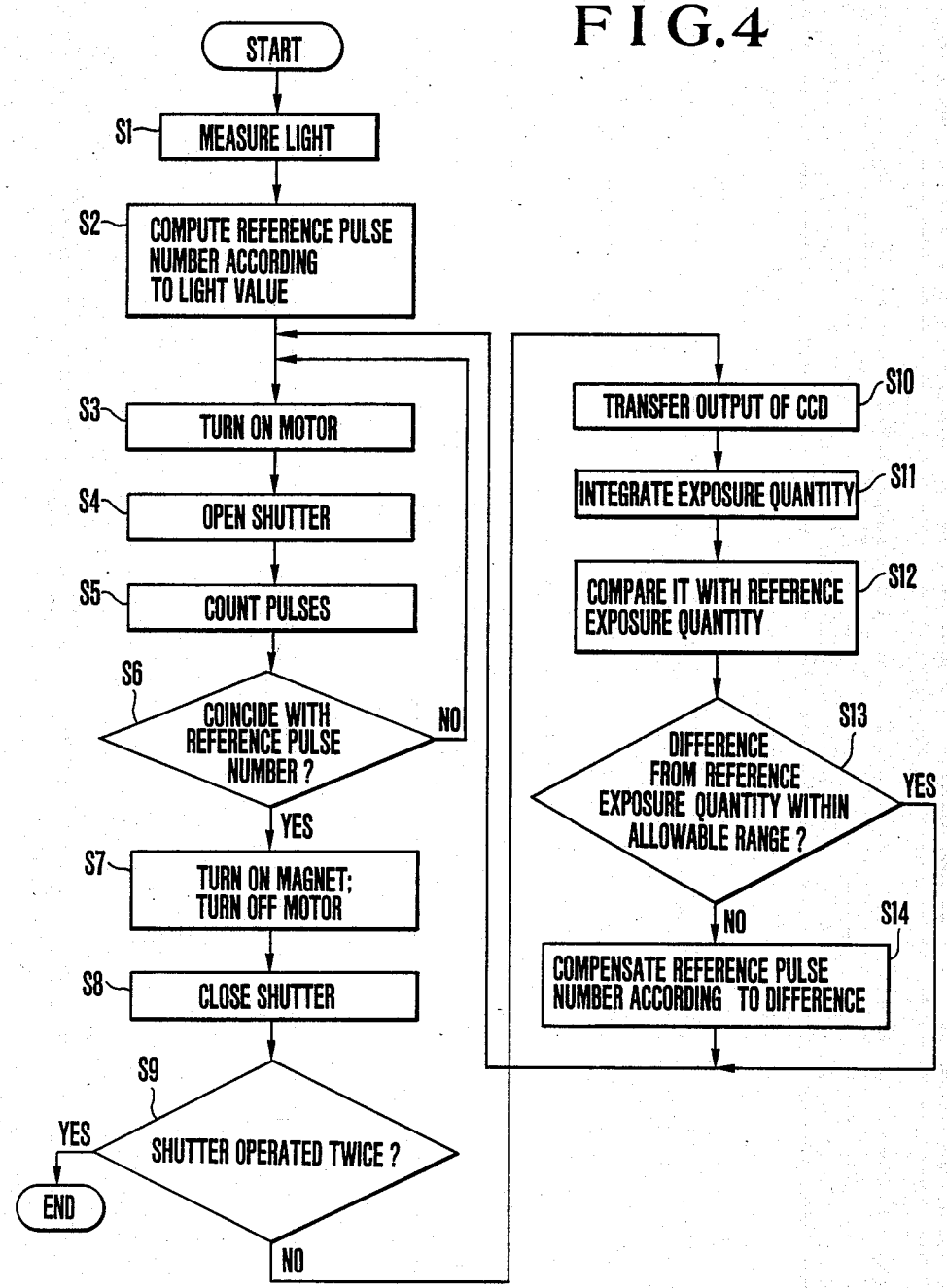
FIG. 4 is a flowchart for the control operation of the exposure device and the associated parts therewith in the camera.
Figure 5:
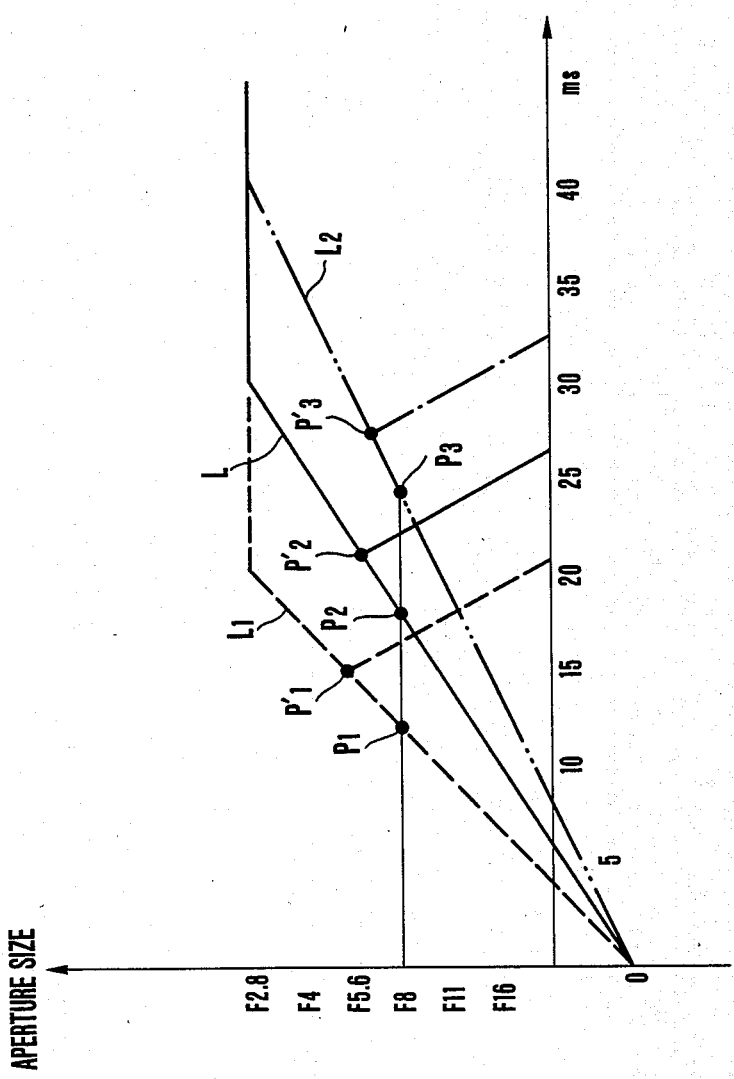
FIG. 5 is a graph illustrating variation of the exposure quantity with variation of the running characteristic of the diaphragm blades in the diaphragm-cum-shutter having the diaphragm blades driven by a motor.

FIG. 3 is a timing chart illustrating a manner in which the exposure device of this embodiment having the features shown in FIG. 1 and FIG. 2 and the associated parts therewith in the camera operate. FIG. 4 is a flowchart illustrating the control operation of the exposure device and associated parts therewith in the aforesaid camera.

Referring to FIG. 1 through FIG. 4, the operation of the camera and the exposure device is described below.

When the camera user with intention of taking a shot manipulates the release button of the camera by half pushing at a time $t_1$, the release circuit 31 is turned on to actuate the light measuring circuit 28, thereby carrying out a light measurement (step S1). Upon completion of the light measurement, the light measuring circuit 28 produces an output representing the measured light value which is supplied to the operation reference value computing and selecting means 18. The computing circuit 26 in that means 18 computes a reference value (reference pulse number) for the amount of movement of the diaphragm blades in correspondence to the measured light value (step S2). Then, a current is supplied through the shutter control circuit 29 to the motor 11 (step S3) so that the motor 11 rotates the pinion 12 in the counterclockwise direction in FIG. 1. Therefore, the rack 3 is moved in the direction of arrow D in FIG. 1, which in turn causes the gear 5 to rotate about the shaft 5a in the counterclockwise direction. Because counterclockwise rotation of the gear 5 causes counterclockwise revolution of the shaft 6b about the shaft 5a, the swinging member 6 is displaced around the shaft 5a in the counterclockwise direction through the shaft 6b, so that the engagement piece 8a in engaging relation with the swinging member 6 is rotated about the shaft 8b in the counterclockwise direction. As a result, the main body of the blade drive plate 8 of unified form with the engagement piece 8a is rotated about the shaft 8b in the counterclockwise direction. Therefore, the drive pins 8c and 8d also are caused to displace around the shaft 8b in the counterclockwise direction so that the diaphragm blade 1 is moved in the direction of arrow B, while the diaphragm blade 2 is moved in the direction of arrow A. Thus, the shutter is opening (step S4). The size of this opening of the shutter (in other words, the amount of movement of the opening and closing members) is detected as a pulse number by the detecting circuit 32 as the slider 9 born on the blade drive plate 8 moves while coming into contact with the conductive pattern on the upper surface of the encoder 16. The pulses are being counted by a counter in the detecting circuit 32 (step S5), while simultaneously, in the shutter control circuit 29, the number of counted pulses is then compared with the above-described reference pulse number (the reference pulse number computed based on the measured light value) (step S6). And the shutter control circuit 29 permits the motor 11 to continue rotating counterclockwise so that the diaphragm blades 1 and 2 continue opening, so long as the pulse number detected by the encoder 16 does not reach the reference pulse number.

Meanwhile, as the diaphragm blades 1 and 2 are being moved in such a manner, light enters the image sensor 20 at the same time that the shutter starts to open. The image sensor 20 starts to store the charges corresponding to all the incident light amount on itself.

Then, when the pulse number detected by the encoder 16 has coincided with the reference pulse number, the motor 11 is stopped by the shutter control circuit 29 so that the opening operation of the diaphragm blades 1 and 2 terminates and the encoder 16 no longer produces the output (step S7). At the same time that the signal for stopping the motor 11 is output at a time $t_2$, another signal for initiating a current supply to the electromagnet 13 is output from the shutter control circuit 29. Therefore, as the electromagnet 13 is energized, one armed portion 14c of the armature 14 is attracted to the core of the electromagnet 13 (step S7). The armature 14 is then turned about the pin 14b in the clockwise direction. Because the other armed portion 14a of the armature 14 expels the post 6a of the swinging member 6 forward in FIG. 1, the swinging member 6 is turned about the shaft 6b in the counterclockwise direction. As a result, the pawled portion in one end of the swinging member 6 is disengaged from the engagement portion $8a_1$ of the engagement piece 8a. Therefore, the blade drive plate 8 is rotated by the force of the spring 10 in the clockwise direction, so that the diaphragm blade 1 is moved in the direction of arrow A by the drive pin 8c, while the diaphragm blade 2 is moved to the direction of arrow B by the drive pin 8d. Thus, the initial position is regained with the result that the shutter (the aperture opening) is rapidly closed (step S8). Meanwhile, the rack 3, because of de-energization of the motor 11, is moved by the force of the spring 4 in the direction of arrow C and returns to the initial position. Incidentally, since the force of the spring 4 is set to be stronger than the cogging torque of the motor 11, the returning movement of the rack 3 to the initial position is accompanied with clockwise rotation of the pinion 12 and the output shaft of the motor 11 to the initial position. Because, at the same time as that, the shaft 6b also is revolved around the shaft 5a in the clockwise direction, the gear 5, too, is rotated about the shaft 5a in the clockwise direction. It should be pointed out that this first opening and closing operation is a non-exposure (non-shot) opening and closing operation, which is a preliminary opening and closing operation that is performed prior to the actual shooting operation.

In such a manner, the shutter is opened and closed for the first time. After that, the charges stored in the image sensor 20 corresponding to all the amount of light incident on the image sensor 20 during the first opening and closing operation are read out, from a time $t'_2$ onward, in sequence as the output of the image sensor 20 through the signal processing circuit 21 (step S10), and the aforesaid output is supplied to, and integrated by, the integration circuit 22 (step S11). The integrated value in the integration circuit 22 represents the whole light amount incident on the image sensor 20 during the first opening and closing operation. The output of the integration circuit 22 is supplied to the comparison circuit 25 in which it is compared with the reference exposure quantity 27 (step S12). The comparison circuit 25 produces an output representing the difference between the reference exposure quantity 27 and the output of the integration circuit 22, which is then supplied to the computing circuit 26. In the computing circuit 26, whether the difference between the reference exposure quantity 27 and the output of the integration circuit 22 lies within an allowable range is evaluated (step S13). If it does not lie in the allowable range, then the aforesaid reference pulse number (i.e., the reference amount of opening movement of the diaphragm blades) is compensated on the basis of the aforesaid difference and the measured light amount. Thus, a new reference value for the amount of opening movement is computed. Then, the shutter control circuit 29 is caused to set this new reference value for the amount of opening movement as the renewed reference value (step S14). Incidentally, the operation of integrating the output of the image sensor 20 and then judging the difference between the output of the integration circuit 22 and the reference exposure quantity 27 is carried out in a period labeled "evaluation" between times $t_4$ and $t_5$ in FIG. 3.

Since a new opening movement amount reference value newly set in the aforesaid evaluating operation has been formed on the basis of the actual incident light amount, in a case where the amount of opening movement of the diaphragm blades is controlled in accordance with this new opening movement amount reference value, even if the running characteristic of the diaphragm blades has changed by, for example, a change of the drive voltage of the motor 11, the amount of opening movement of the diaphragm blades can be controlled so that a predetermined exposure quantity results.

Meanwhile, in another case where the difference between the output of the integration circuit 22 and the reference exposure quantity 27 is determined in the aforesaid evaluating operation to fall within the allowable range, as it implies that no large change occurs in the running characteristic of the shutter blades and even that back lighting is not taking place, no new movement amount reference value is formed so that a diaphragm blade movement amount reference value to be set in the shutter control circuit 29 becomes equal to the reference value (reference pulse number) used in the first or preliminary opening and closing operation. Therefore, as will be described below, the reference value in accordance with which the amount of opening movement of the diaphragm blades in the second or actual exposure opening and closing operation is to be controlled, becomes the same as the reference value in the first or preliminary opening and closing operation.

When such an evaluating operation as described above has ended, from a time $t_6$, the motor 11 is rotated again in the counterclockwise direction by the shutter control circuit 29 (step S3). In accompaniment with this, in a similar manner to that described above, the diaphragm blades 1 and 2 are forcibly driven by the power of the motor 11 in the shutter opening direction (step S4). At the same time, the amount of movement of the diaphragm blades 1 and 2 is detected as a pulse signal by the encoder 16 (step S5) and is compared with the movement amount reference value in the shutter control circuit 29 (step S6). With this, if the diaphragm blade movement amount reference value (reference pulse number) set in the shutter control circuit 29 is the new movement amount reference value compensated by the aforesaid evaluating operation, the amount of opening movement of the diaphragm blades 1 and 2 becomes different from the amount of opening movement when in the first or preliminary opening and closing operation. Hence the opening operation is carried out in accordance with the actual incident light amount.

Meanwhile, in a case where no new movement amount reference value has not been set by the aforesaid evaluating operation, the diaphragm blade opening movement in the second or actual exposure operation also is controlled by the movement amount reference value in the first or preliminary or non-exposure operation.

When the value detected by the encoder 16 and the movement amount reference value have coincided with each other (time t₇), a current is supplied from the shutter control circuit 29 to the electromagnet 13 and the current supply to the motor 11 is stopped (step S7). Likewise as in the first cycle, the diaphragm blades 1 and 2 are then moved in the closing direction by the force of the spring 10 (step S8). After the shutter has been closed, because the fact that the shutter has twice operated is detected in a step S9, it occurs at times t₈–t₉ that the signal of the image sensor 20 is read out and recorded as still picture information. After that, the release switch turns off.

The opening movement amount reference value which is set for the second opening and closing operation is determined based on the shutter blade movement amount or the incident light amount in the first or preliminary opening and closing operation. Therefore, in the second opening and closing operation, the timing of production of the actuating signal for the electromagnet 13 is compensated to what foresees the delay of operation of the electromagnet 13. In the exposure device of this embodiment, therefore, even if there has been a change in the running characteristic of the diaphragm blades, the exposure control can be made always with high accuracy. Moreover, even if the measured light information by the light measuring element is in error due to the back lighting, etc., this can surely be compensated.

As has been described above, in the exposure device of the invention, the reference value for the second or exposure opening and closing operation is formed based on the value detected in the first or non-exposure opening and closing operation, and it is by that reference value that the second or exposure opening and closing operation is controlled. Hence, even if it happens that the running characteristic of the opening and closing members such as the diaphragm blades changes, the fluctuation of the accuracy of control which would otherwise result from that change can be prevented from occurring. Thus, the exposure control can be made always with high accuracy.

What is claimed is:

1. An image sensing apparatus comprising:
   (a) image sensing means;
   (b) diaphragm means of a normally closed type for controlling light entering said image sensing means;
   (c) a light measuring element, other than said image sensing means, for detecting a brightness of an object to be photographed to form first information;
   (d) control means for performing a first exposure operation in which said diaphragm means is opened from a fully closed state to a predetermined size of aperture opening on the basis of the first information formed by said light measuring element and, after that, is fully closed again and a second exposure operation in which said diaphragm means is opened from the fully closed state to a predetermined size of aperture opening on the basis of second information formed in said image sensing means during said first exposure operation and, after that, is fully closed again; and
   (e) recording means for recording an electrical signal formed in said image sensing means during said second exposure operation as still picture information.

2. An apparatus according to claim 1, wherein said diaphragm means has aperture value detecting means for producing a signal corresponding to an aperture value thereof.

3. An apparatus according to claim 1, further comprising comparison means for comparing said first information and said second information with each other to obtain a comparison result.

4. An apparatus according to claim 3, wherein said control means controls a size of aperture opening in said second exposure operation in accordance with the comparison result of said comparison means.

5. An apparatus according to claim 4, wherein said control means causes a size of aperture opening in said second exposure operation to change to a value different from a size of aperture opening in said first exposure operation when a difference between said second information and said first information is greater than a predetermined value.

6. An image sensing apparatus comprising:
   (a) image sensing means for accumulating an electrical signal corresponding to an amount of incident light;
   (b) a light measuring element, other than said image sensing means, for detecting a brightness of an object to be photographed to form first information;
   (c) accumulation control means for controlling a condition of accumulation in said image sensing means, said accumulation control means causing said image sensing means to perform a first accumulating operation in said image sensing means under a condition based on said first information formed by said light measuring element, and forming second information from an electrical signal accumulated in said image sensing means during said first accumulating operation; and
   (d) discriminating means for computing a difference between said first information and said second information and for causing said image sensing means to perform a second accumulating operation under a condition based on said second information when said difference is greater than a predetermined value and causing said image sensing means to perform said second accumulating operation under a condition based on said first information when said difference is not greater than said predetermined value.

7. An apparatus according to claim 6, wherein said accumulation control means includes diaphragm means.

8. An apparatus according to claim 7, wherein said diaphragm means is diaphragm means of a normally closed type.

9. An apparatus according to claim 7, wherein said accumulation control means controls a maximum size of aperture opening of said diaphragm means.

10. An apparatus according to claim 7, wherein said diaphragm means has aperture value detecting means for producing a signal corresponding to an aperture value thereof.

* * * * *